Dec. 6, 1966 R. A. WILLYARD 3,289,777
READING SYSTEM
Filed Dec. 7, 1964
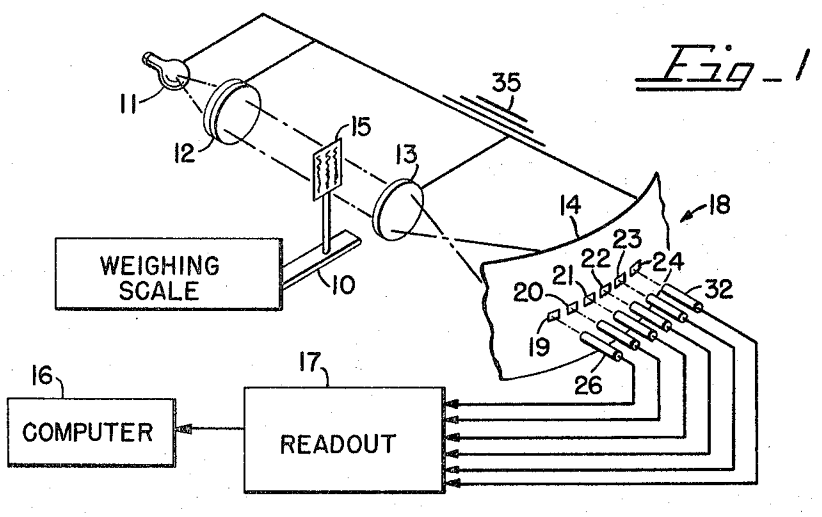
Fig. 1
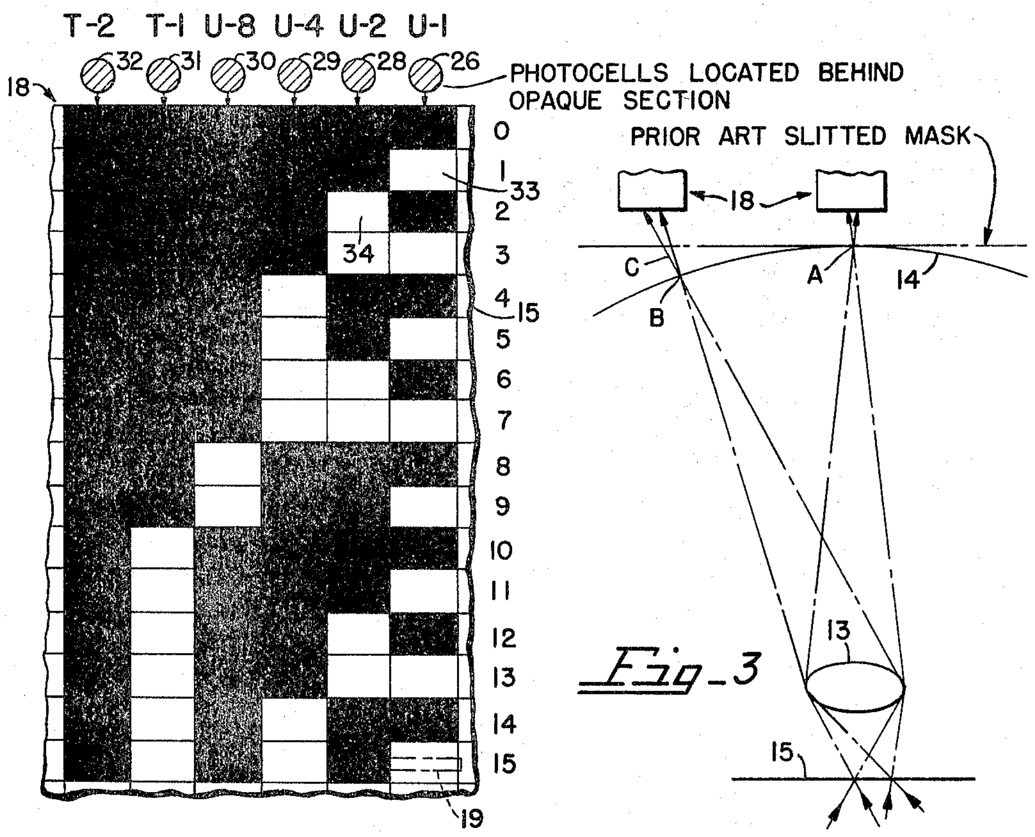
Fig. 3
Fig. 2
INVENTOR.
ROGER A. WILLYARD
BY
Thomas H. Grafton
ATTORNEY United States Patent Office 3,289,777

Patented Dec. 6, 1966

3,289,777

READING SYSTEM

Roger A. Willyard, Toledo, Ohio, assignor to Toledo Scale Corporation, Toledo, Ohio, a corporation of Ohio Filed Dec. 7, 1964, Ser. No. 416,524
7 Claims. (Cl. 177—178)

This invention relates generally to reading systems such as shaft encoders and weighing scale readout systems, and in particular to converters such as analog to digital converters for such systems.

The converters are of the type in which transparent areas of a code chart are sensed by photosensitive means to provide a digital output indicative of the chart position. Typical converters have an optical element in the form of a disk, drum or strip, which contains bands having transparent and opaque areas arranged to represent a code. Each digital position will then have a unique combination of energized and deenergized sensing devices. The optical element is positioned between a light source and photosensitive cells so that the output of each cell is determined by the portion of the band which lies between the cell and the light source. By properly dividing the band into opaque and transparent areas, a code representing unque combinations of photocell outputs may be provided for each digital position. A flat slitted-mask is juxtaposed to the photosensitive means for the purpose of masking out unwanted opaque and transparent areas of the bands.

Commonly, the bands are arranged according to binary order so that one band represents the units order or $2^{\circ}$, the second band $2^1$, the third band $2^2$, and the last band $2^{nth}$, the value of $n$ depending on the number of digital positions desired. If such an arrangement is followed, the bands will have apertures or transparent areas in binary code, thereby providing a unique combination of energized photosensitive means for each digital position. The use of binary code is very desirable, since it provides an output which is compatible to the input of most computers with which a converter is likely to be used.

The difficulty with such arrangements using such flat slitted masks is that the systems are sensitive to the sagittal focus of the projection lenses used in such arrangements and the chart bit images are focused on the flat masks which do not contain the sagittal focus surfaces. Because of this, the electrical signals from the photosensitive means are low requiring circuits of high cost, which sometimes are unreliable, to determine whether or not the photosensitive means are on or off.

A description of "sagittal" focal and "tangential" focal planes is found in "Fundamentals of Optics," 2nd edition, by Jenkins and White and published by McGraw-Hill Book Company, on pages 138–140. The above systems are not sensitive to the tangential focus (surface where circumferential lines are in best focus) of the projection lenses, and in any event the slitted masks mask off the junctions between the opaque and transparent areas (chart bits) in the same row (perpendicular to chart travel). However, the above systems are sensitive to the sagittal focus (surface where radial lines are in best focus) of the projection lenses because the systems must distinguish between adjacent bits in the direction of chart travel (distinguish between light and dark).

Accordingly, the objects of this invention are to improve photosensitive reading systems, to improve analog to digital converters, and to increase the electrical signals from the photocells in photosensitive reading systems.

One embodiment of this invention enabling the realization of these objects is a computing weighing scale system having mechanical and optical portions constructed similarly to the computing weighing scale disclosed in U.S. Patent No. 3,130,802, issued Apr. 28, 1964 in the name of R. E. Bell which shows a scanner readout to provide a computer with an indication of weight upon the scale. The scanner readout scans a chart having weight graduations in the form of lines which produce a series of electrical pulses corresponding in number to the weight of the load upon the scale. In the present system, the chart, instead of having weight graduation lines, has a matrix of binary coded decimal markings (1–2–4–8 binary coded decimal) arranged in bands or columns so that the relative positions thereof may be read by a bank of photocells, with one cell being associated with each column, providing a binary indication of the weight upon the scale. The scale as used in this invention includes a chart which is moved in accordance with load upon the scale by the above mechanical scale portion, the chart being moved in the above optical portion of the weighing scale system. The photocells are part of an analog to digital converter which makes available weight information to the input of a computer.

A slitted-mask or aperture plate is juxtaposed to the photocells for the purpose of masking out unwanted opaque and transparent areas of the columns of binary coded decimal markings. The mask is curved to match the sagittal focal plane of the projection lens in the optical system, the chart bit images being focused in the mask slits.

In accordance with the above, the principal feature of this invention resides in increasing significantly the photocell outputs by curving the slitted-mask to match the sagittal focal plane of the projection lens.

The above and other objects and features of this invention will be appreciated more fully from the following detailed description when read with reference to the accompanying drawings wherein:

FIG. 1 is a diagrammatic view of a portion of an automatic computing weighing scale system;

FIG. 2 is an enlarged, fragmentary, diagrammatic view of the chart shown in FIG. 1 representing a 1–2–4–8 binary coded decimal chart; and FIG. 3 is a diagram showing a portion of the optical system illustrated in FIG. 1 in plan.

Referring to the drawings, the computing weighing scale disclosed in the above U.S. Patent No. 3,130,802 includes a lever 10 and an optical projection system which diagrammatically includes a light source 11, a condensing lens 12, a projection lens 13 and a photocell mask 14. The light source 11, the lenses 12 and 13, and the mask 14 are connected to ground as shown at 35 (e.g., base of weighing scale), the mask 14 being rigidly mounted with respect to the projection optics. A binary coded decimal chart 15 is used in the reading system of the invention and is moved by the load-responsive lever 10 in the optical projection system, the chart 15, hence, being condition responsive. A computer 16 receives weight information from the scale and multiplies the weight of an article upon the scale by the unit price of such article to compute the value of such article. The computer 16 may be of any kind having an input which is compatible with the parallel 1–2–4–8 binary coded decimal output of an electrical readout 17 in circuit therewith. The complete description of an analog to digital converter is not necessary to a full understanding of this invention.

The difficulty with arrangements employing binary code is the ambiguous output from the photocells as they sense the transition from one digital position to the next. Since the photocell senses an area of definite width, it begins to sense the next digital position before it has completely left the previous position. For example, in the binary 1–2–4–8 code

| | Binary | | | |
|---|---|---|---|---|
| | 8 | 4 | 2 | 1 |
| 0 | — | — | — | — |
| 1 | — | — | — | X |
| 2 | — | — | X | — |
| 3 | — | — | X | X |
| 4 | — | X | — | — |
| 5 | — | X | — | X |
| 6 | — | X | X | — |
| 7 | — | X | X | X |
| 8 | X | — | — | — |
| 9 | X | — | — | X |

in passing from digital position 3 to position 4, the photocells for the 1 and 2 binary bands may continue to sense the code marks for digital position 3 after the photocell for binary band 4 has begun to sense the code mark in that band for digital position 4. During the transition from 3 to 4, the photocells may therefore indicate anything from digital 3 to 7, before the outputs stabilize at digital 4. If the chart stops between graduations or bits, any diffculty may be overcome by using the optical detent disclosed in U.S. application Ser. No. 313,371, filed Oct. 2, 1963, in the name of Orval J. Martin, wherein a movable prism is used to bend a light path slightly whenever the chart stops between chart graduations or bits.

The problem of spurious outputs during transition between digital positions has been solved in the prior art by using a code in which only one cell changes output between positions. Gray codes meet this requirement. U.S. Patent No. 3,061,026, issued Oct. 30, 1962, in the names of W. Hecox et al. discloses a weighing scale having digital readout apparatus using a seven column binary gray code (cyclic code).

The chart 15 has a matrix of binary coded decimal markings arranged in vertical bands or columns so that the relative position thereof may be read by a bank of readout photocells 18, with one cell being associated with each column, providing a binary indication of the weight upon the scale. The output of the photocells is applied to the readout 17, which makes available weight information to the input of the computer 16. The mask 14 is shown as being slitted at 19–24 so that a small and clearly defined portion of the projected image of the chart 15 is permitted to fall on each of the sensitive grids of the photocells, i.e., the mask screens out unwanted chart bits (the projection lens 13 projects all of the bits in its field of view). The mask slit 19 is shown in broken lines in FIG. 2 to show its size relative to a projected chart bit image. The mask slits are about the same width as the projected chart bits in a direction perpendicular to chart movement and are substantially narrower than the projected chart bits in the same direction as chart movement.

The chart 15 has vertical bands with transparent and opaque areas, as indicated in FIG. 2, arranged to represent a 1–2–4–8 binary coded decimal code. The fragment of the chart illustrated in FIG. 2 may be pictured as the projected chart image which is projected onto the sensitive areas of the photocells. The chart 15 is shown in FIG. 2 in zero load position with the readout photocells in the photocell bank 18 located behind the upper opaque horizontal edge (all of the readout photocells see black at zero load position). The first four vertical bands, as viewed in FIG. 2, counting from the right correspond to the units in the weight reading to be read out. These bands are identified as U–1, U–2, U–4 and U–8. The readout photocell 26 is associated with the U–1 band, and readout photocells 28–30 are associated with the U–2, U–4, and U–8 bands, respectively. The next four bands to the left, only two of which are shown, correspond to the tens in the weight reading to be read out. The two bands shown are identified as T–1 and T–2. Readout photocells 31 and 32 are associated with the T–1 and T–2 bands, respectively. Similarly, the next two bands to the right of the units bands which are not shown are the thousands bands and the next four bands to the right of the thousands bands which also are not shown are the hundreds bands. Only two thousands bands are needed because the capacity of the weighing scale is 25.00 pounds, i.e., the number two is the maximum in the thousands place. Since the scale has a capacity of 25.00 pounds, there are 2500 decimal units graduations, i.e., the fragment of the decimal numbers shown in FIG. 2 extending from 0–15 extend in their entirety from 0 through 2500. Accordingly, there is a total of fourteen photocells in the photocell bank 18, i.e., one for each of the fourteen chart bands, only six of the fourteen readout photocells being shown for the sake of simplicity. When the chart 15 is moved by the weighing mechanism so that photocell 26 sees the transparent area 33 (sees white), a decimal one in the units place is indicated in accordance with the above binary 1–2–4–8 code table. When such photocell 26 sees an opaque area (sees black) and the photocell 28 sees the transparent area 34, a decimal two in the units place is indicated, etc. This information is made available to the readout device 17.

The projection lens 13 projects a bundle of chart bit images, i.e., all in its field of view. The photocells in the photocell bank 18 need not distinguish between junctions between chart bits in the same row (perpendicular to chart travel—the portions of the mask 14 between the slits 19–24 mask off such junctions). The system is not sensitive to the tangential focus of the projection lens, i.e., the circumferential lines which are in focus in the tangential focal surface can be ignored in the design of the system. However, the photocells must distinguish between adjacent chart bits in the direction of chart travel, i.e., as the projected chart portion flashes by the photocells they must distinguish between light and dark. If the photocells should see gray, their electrical output does not give a sharp indication of just what they see. Hence, the system is sensitive to the sagittal focus of the projection lens 13, i.e., the radial lines of chart bits are in focus in the sagittal focal surface. The principal feature of the system resides in increasing significantly the photocell outputs by curving the slitted-mask 14 to match the sagittal focal plane of the projection lens 13. The curved mask 14 shown in FIG. 3 contains the sagittal focal surface where radial image lines (rows of chart bits—perpendicular to chart travel) are in best focus.

With reference to FIG. 3, both the curved slitted mask 14 of the invention and the flat mask (broken lines) of the prior art are shown. The projection lens 13 focuses the radial image lines on both masks at A. However, in all other locations on the masks only on the mask 14 of the invention are the radial image lines in focus. For example, the radial image lines are in focus at B on the mask 14 but when such images reach the prior art mask they are no longer in focus as shown in FIG. 3. The radial image lines are sharply focused at the slits of the curved mask 14 and, accordingly, the photocells in the photocell bank 18 are able to distinguish clearly between light and dark, i.e., to distinguish clearly between adjacent bits in the same vertical chart column (in direction of chart travel). By seeing the radial image lines in focus at B, the respective photocells can distinguish sharply whether or not the image is light or dark. However, the same image by the time it reaches area C on the prior art mask is getting out of focus and the photocell sees a gray area. By seeing sharply focused radial image lines, the photocell signals are increased and it makes it easier for the readout circuit 17 to determine whether or not the photocells are on or off. This means that the readout circuitry used with the photocell system of the invention can be of low cost (simpler) and, thus, is more reliable.

In summary, the reading system of the invention includes a condition responsive chart bearing bits arranged according to a code, photosensitive means, projecting lens means for projecting chart images onto the photosensitive means, whereby the photosensitive means provides a coded output indicative of the chart position, and slitted mask means between the projection lens means and the photosensitive means for restricting the chart images which are projected onto the photosensitive means to small and clearly defined portions of the projected images, the mask means being so located relative to the projection lens means and being so formed to about match the sagittal focal plane of the projection lens means that all of the chart bit images are approximately focused at the mask slits.

It is to be understood that the above description is illustrative of this invention and that various modifications thereof can be utilized without departing from its spirit and scope.

Having described the invention, I claim:

1. A reading system comprising, in combination, a condition responsive chart bearing bits arranged according to a code, photosensitive means, projection lens means for projecting chart images onto the photosensitive means, whereby the photosensitive means provides a coded output indicative of the chart position, and slitted mask means between the projection lens means and the photosensitive means for restricting the chart images which are projected onto the photosensitive means to small and clearly defined portions of the projected images, the mask means being so located relative to the projection lens means and being so curved to about match the sagittal focal plane of the projection lens means that all of the chart bit images are approximately focused at the mask slits.

2. A reading system according to claim 1 wherein the mask slits are about the same width as the projected chart bits in a direction perpendicular to chart movement and are substantially narrower than the projected chart bits in the same direction as chart movement.

3. A reading system comprising, in combination, a condition responsive chart bearing bits arranged according to a code, photosensitive means, projecting lens means for projecting chart images onto the photosensitive means, whereby the photosensitive means provides a coded output indicative of the chart position, and slitted mask means formed to about match and located about in the sagittal focal plane of the projection lens means between the projection lens means and the photosensitive means for restricting the chart images which are projected onto the photosensitive means to small and clearly defined portions of the projected images.

4. A reading system according to claim 3 wherein the projection lens means and the slitted mask means are rigidly mounted with respect to each other.

5. A reading system according to claim 3 wherein the mask silts are about the same width as the projected chart bits in a direction perpendicular to chart movement and are substantially narrower than the projected chart bits in the same direction as chart movement.

6. A weighing scale system comprising, in combination, a load responsive chart bearing bits arranged according to a code, photosensitive means, projecting lens means for projecting chart images onto the photosensitive means, a computer in circuit with the photosensitive means, whereby the photosensitive means provides a coded input indicative of the chart position to the computer, and slitted mask means between the projection lens means and the photosensitive means for restricting the chart images which are projected onto the photosensitive means to small portions of the projected images, the mask means being so located relative to the projection lens means and being so curved that all of the chart bit images are approximately focused at the mask slits.

7. A reading system according to claim 6 wherein the mask slits are about the same width as the projected chart bits in a direction perpendicular to chart movement and are substantially narrower than the projected chart bits in the same direction as chart movement.

References Cited by the Examiner

UNITED STATES PATENTS

| | | | |
|---|---|---|---|
| 2,577,815 | 12/1951 | Saunderson et al. | 250—209 |
| 2,963,222 | 12/1960 | Allen | 235—151 |
| 3,130,802 | 4/1964 | Bell | 177—12 |

RICHARD B. WILKINSON, *Primary Examiner.*